Jan. 7, 1936. J. H. ABRAMSON ET AL 2,027,139
TUBULAR BORING TOOL
Filed April 21, 1933 2 Sheets-Sheet 1
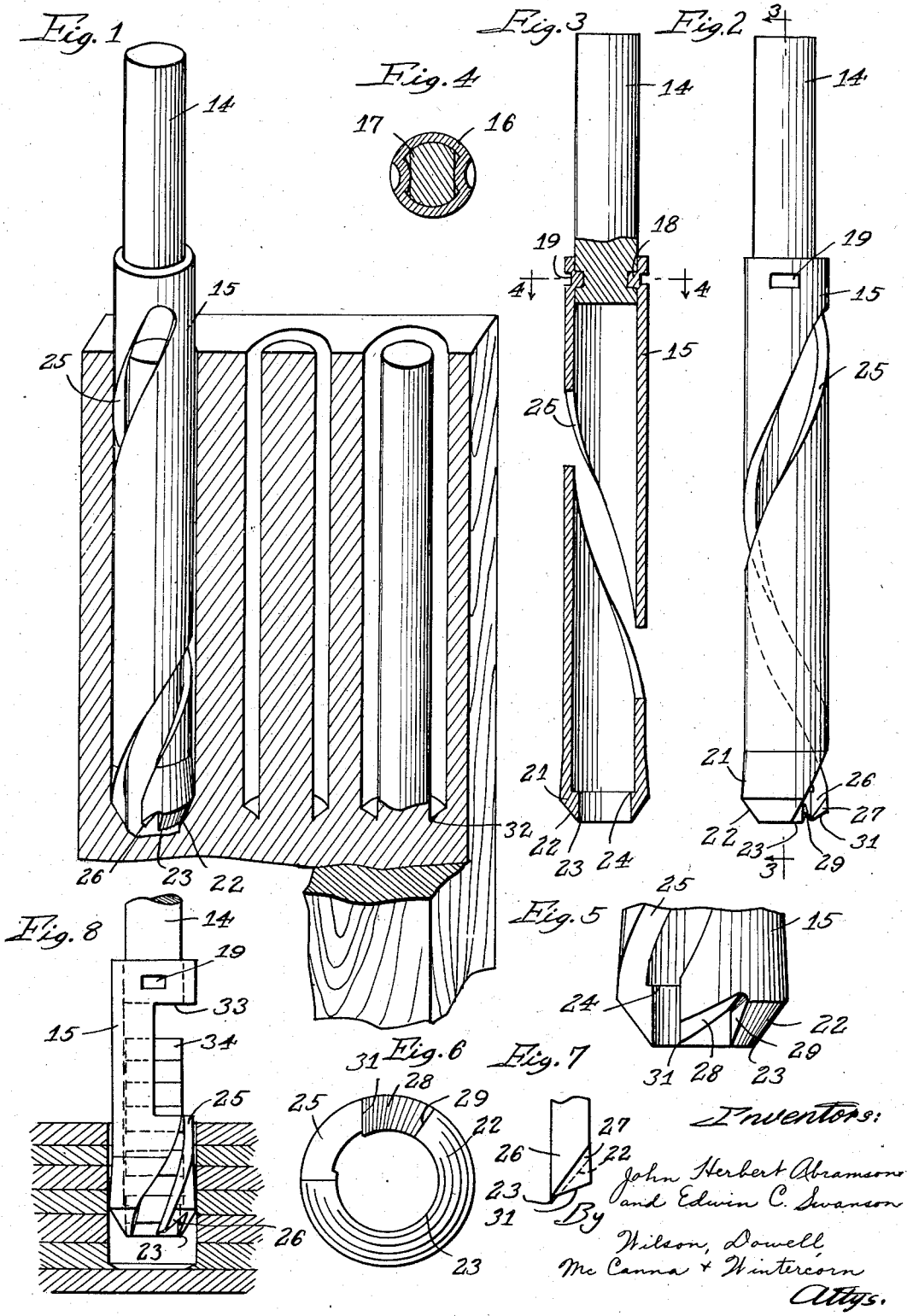

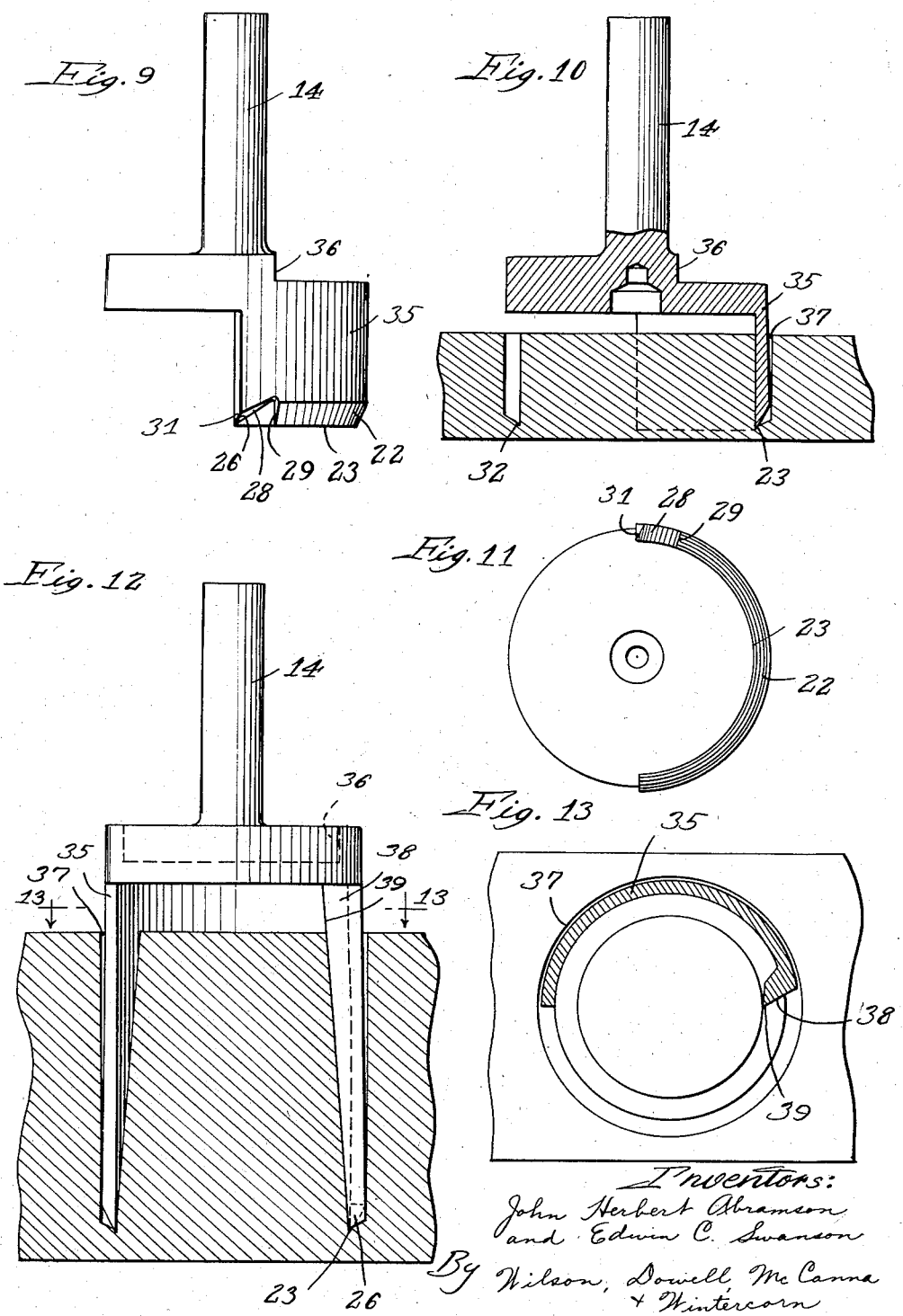

Patented Jan. 7, 1936

2,027,139

UNITED STATES PATENT OFFICE 2,027,139

TUBULAR BORING TOOL

John Herbert Abramson and Edwin C. Swanson, Rockford, Ill., assignors to Greenlee Bros. & Co., Rockford, Ill., a corporation of Illinois Application April 21, 1933, Serial No. 667,186

6 Claims. (Cl. 145—120)

This invention relates to boring tools particularly adapted to woodworking and more especially a tool of the type adapted to cut out cylindrical bodies, such as plugs, pins, and the like.

An object of the invention is the provision of a tool of the character described adapted for cutting tubular holes in soft material, such as wood, and adapted for use in making dowel pins, plugs, bungs, and the like, having either straight or tapered sides.

Another object of the invention is the provision of a tool of the character described having a tubular body arranged to pass into the work piece and means for relieving the inner and outer surfaces of the body back of the cutting end.

A further object of the invention is the provision of a tubular cutting tool having means for centering and steadying the cutting tool as it enters the work piece.

A still further object of the invention is the provision of a tool of the character described having means for making a smooth cut at the point where the tool emerges from the work piece.

A still further object of the invention is the provision of a tool which enters the work piece with a gradually increasing cut.

Another object of the invention is to provide a means for cutting tapered cylindrical objects, such as bungs.

Other objects and attendant advantages will become apparent to those skilled in the art from the following description and the accompanying drawings, in which—

Figure 1 is a perspective of one embodiment of the tool showing its position in the work piece after the completion of a cut and showing in the work piece the type of cut formed;

Fig. 2 is a side elevation of the embodiment shown in Figure 1;

Fig. 3 is a section on the line 3—3 of Fig. 2;

Fig. 4 is a section on the line 4—4 of Fig. 3;

Fig. 5 is an enlarged view of the cutting end of the tool;

Fig. 6 is an end view of the cutting end of the tool;

Fig. 7 is a front view of the cutter, the scribing edge being distorted to appear directly behind the cutter to show the difference in position of the cutter and the scribing edge;

Fig. 8 is an elevation of a modified form of tool showing the work piece in section, a portion of the wall of the tool being cut away in this embodiment for the removal of the plugs;

Fig. 9 is a side elevation of a further embodiment of the invention;

Fig. 10 is a vertical section through the embodiment shown in Fig. 9 and through a work piece;

Fig. 11 is a bottom view of the tool;

Fig. 12 is a side elevation of a fourth embodiment of the invention showing the work piece in cross-section, and Fig. 13 is a section on the line 13—13 of Fig. 12.

The invention contemplates the provision of a cutting tool comprising a tubular body having a tubular cutting end. Cutting means are located on the tubular walls of the body, at its cutting end. The cutting end is preferably of slightly larger outside diameter than the remainder of the body so as to relieve the outer surface of the body to prevent the body from binding between its outer surface and the outer surface of the cut. Likewise, the inner diameter of the end may be slightly smaller than the inner diameter of the remainder of the body so as to relieve the body from the plug or pin being cut. Where the tool is long it is advisable to provide a spiral slot through the walls of the body for the purpose of elevating the chips. For other purposes, it is sometimes advisable to cut away a portion of the wall of the body so that the plugs or other cylindrical bodies being cut out may be removed from the tool without stopping the rotation of the same.

Referring first to Figures 1–7, inclusive, an embodiment is shown of the type adapted to cut long cylindrical bodies, such as dowel pins, and consists of a shank 14 and tubular body 15. The shank and body may be formed separately and secured together as shown in Figs. 3 and 4, by means of slots 16 and 17 formed in opposed sides of the shank into which portions of the tubular body may be pressed, as shown at 18 and 19. However, if desired, the shank and body may be formed of a single piece of metal. In this instance, we have shown the shank as being of a type for reception in a power operated chuck, but it will be understood that the shank may also be made for reception into hand operated braces and the like. The body 15 consists of a tube having the shank 14 positioned in one end thereof, the opposite end thereof being open. The lower end of the tube is slightly larger directly adjacent to its lower end, as shown at 21, and is then beveled inward, as shown at 22, to provide a sharp cutting edge 23, which we have herein designated as the scribing edge. The opening or bore of the lower end of the tube, which is herein called the cutting end, is slightly smaller than the remainder of the tube, as shown at 24, so as to provide clearance between the inner wall of the main body of the tube and the pin being cut. A slot 25 is formed helically in the wall of the tube and extends from the lower end to a point adjacent the upper end, as shown in Figure 1. This slot serves to remove the chips from the bottom of the cut. At the point where one side of the slot 25 intersects the end of the tube, a cutter designated generally by the numeral 26 is formed in the wall of the tube. This cutter is in the form of a tooth and has a face 27 extending longitudinally of the tool and a relieved face 28 helical with respect to the tube extending back to the forward end 29 of the scribing edge 23. We have found that a somewhat smoother surface results in the pin being cut if the longitudinal face 27 of the cutter is inclined at an angle in the region of 15° with respect to the radius. Joining the faces 27 and 28 of the cutter is a transverse cutting edge 31 which is preferably sloped upward so that the edge lies at an angle less than 90° with respect to the axis of the tool. It will be seen that this permits the cutter to gradually engage the work, the lower or inside corner of the cutter first engaging the work and, as the cutter is advanced, the edge gradually engaging to a greater extent until the tool has completely entered the work. This prevents the tool from grabbing and taking too great a bite directly at the start of the cut.

A feature of the invention lies in the fact that the scribing edge 23 lies in a plane such as to enter the work prior to the cutter 26. Thus, in inserting the tool the scribing edge 23 first contacts the work and through its rotation forms a circular scribe, as shown at 32, defining the diameter of the pin being cut. This also serves to center and steady the tool in entering the work to prevent its chattering and to prevent the tool from moving the work. After the scribing edge has entered the work a short distance, the point of the cutter 26 begins to take a small cut directly adjacent to the cut formed by the scribing edge. As the tool moves into the work the bite of the cutter increases until it cuts a tubular opening of a thickness equal to the thickness of the walls of the head of the tube. Thus, as the tool enters the work, the scribing edge 23 leads the cutter forming a smooth surface on the pin being cut and centering the tool as it passes through the work. It will also be observed that when the tool emerges from the work, that is, when the tool passes completely through the wood and emerges on the opposite side, the scribing edge emerges first and makes a sharp smooth cut at the point of emergence instead of the jagged tearing cut common to toothed cutters.

Referring now to Fig. 8, a portion of the walls of the body may be cut away, as shown at 33, so that the pin or plug will be removed from the tool without stopping the rotation thereof. This is of particular advantage in a power driven tool. In this figure, we have shown the tool in use in cutting thin plugs from a plurality of layers of work material. It will be seen that with rotation of the tool, the plugs shown at 34, will be thrown from the tool by the rotation thereof so that it becomes necessary to stop the tool to remove these plugs between successive boring operations. In this figure, we have also shown a tool of shorter body length but it will be understood that the tool may be made in any length depending upon the length of the pins to be cut.

In Figs. 9–13, inclusive, we have shown modifications particularly adapted for cutting bungs or other plugs of similar nature, the tools being substantially identical in principle with those shown in Figs. 1–8, inclusive. In this instance, the shank 14 has a body 35 of arcuate cross-section which consists, in the size shown, of only one half of a tube, as best shown in Figs. 11 and 13. It is advisable to remove a portion of the metal, as shown at 36, on the side of the tool carrying the tubular portion 35 to compensate for the difference in weight of the two sides and thus balance the tool for rotation. The body consisting of only half a complete tube, the plugs can slide directly out of the side of the body when the tool is removed from the work piece. The lower edge of the body 35 also carries the scribing edge 23, the beveled portion 22 and the cutter 26, the outer face of the tube being relieved, as shown at 37, to provide ample clearance for rotation of the upper part of the tube. In this instance, the scribing edge 23 also leads the cutter 26 and enters the work prior to the cutter, as already described, forming a scribe 32 defining the periphery of the plug to be cut.

In Figs. 12 and 13, a tool similar to that shown in Figs. 9 and 10 is shown having means for forming a tapered plug or bung. The construction is identical with the form shown in Fig. 9 with the exception that a longitudinal cutter 38 is formed on the inner surface of the tubular body 35 and extends from the cutter 26 upward on the inner surface of the tube. This cutter is tapered, as shown in Fig. 12, and has an inclined cutting edge 39 arranged, as shown in Fig. 13, to cut a taper on the plug as the tool 40 progresses into the work. In this embodiment, the cutter 26 is formed directly on the lower end of the longitudinal cutter 38, as best shown in Fig. 12. In this form, we have also shown the tubular body 35 as being of greater length than that shown in Fig. 9, and it will be understood that the length of the body may vary between wide limits depending upon the length of the plug to be cut.

Attention is directed to the fact that the invention provides a tubular cutter having a scribing edge constituting part of a circle arranged to enter the work piece in advance of a cutter which is also positioned on the tube, the cutter and edge forming a tubular cut for the purpose of cutting out plugs, pins, and the like. The tool is relieved on its inner and outer surfaces to be free running after entering the material and means are provided for elevating the chips. Means are also provided for removing the completed plugs without stopping the tool to accomplish this purpose. The tool is also provided with means whereby the cylindrical surface of the plugs are tapered while being cut. The device embodies means for guiding and steadying the tool as it enters the work and for preventing chattering of the same. Furthermore, the tool forms a clean cut as it emerges from the work in contrast with the usual torn and ragged edges formed by boring tools.

While we have thus described and illustrated a particular embodiment of our invention, we are aware that numerous alterations and changes may be made therein without departing from the spirit of the invention or the scope of the appended claims.

We claim:

1. A tubular boring tool comprising a tubular body, a marginal scribing edge at the inner diameter of said body at its lower end and extending along said lower end through a substantial part of a circle to guide said tool in entering the work, and a cutter formed in the lower end of said body between the ends of said scribing edge arranged to trail said scribing edge in entering the work.

2. A tubular boring tool comprising a tubular body having walls of greater thickness adjacent to one end thereof and terminating in an arcuate scribing edge determining the inside diameter of the cut made thereby and comprising a substantial part of a circle for simultaneous contact throughout its length with the work, to center the tool, and a cutter in the wall of the body for removing the material for the passage of the body through the work, the cutter trailing the scribing edge in entering the work.

3. A boring tool comprising a body comprising a substantial portion of a tube, the body having a portion of its side wall cut away for the removal from the tool of material loosened by the cutting operations, a scribing edge extending a substantial distance along the arcuate end of the tube portion, and a cutter located on the arcuate end of said tube portion to form a tubular cut in a work-piece equal to the thickness of the tube, the scribing edge entering the work-piece prior to the cutter to center the tool.

4. A boring tool comprising a body consisting of a substantial portion of a tube, the body having a shoulder adjacent one end to provide a portion of lesser internal diameter at said end, a scribing edge extending a substantial distance along said arcuate end of the tube portion, and a cutter located on said arcuate end of said tube portion to form a tubular cut in a work-piece, the scribing edge entering the work-piece prior to the cutter to center the tool.

5. A boring tool comprising a body consisting of a substantial portion of a tube, a discontinuous scribing edge extending a substantial distance along the arcuate end of the tube portion, and a cutter located on the arcuate end of said tube in the space between the ends of said scribing edge to form a tubular cut in a work piece, the scribing edge entering the work piece prior to the cutter to center the tool.

6. A boring tool for cutting plugs comprising a tubular body, the walls of which terminate at one end in a discontinuous arcuate cutting edge continuous along a substantial part of said body in a plane transverse to the axis thereof, and a cutter in the space between the ends of the arcuate cutting edge, the cutting edge leading the cutter in entering the work.

JOHN HERBERT ABRAMSON.
EDWIN C. SWANSON.